United States Patent
Chatley, Jr. et al.

(10) Patent No.: US 6,230,624 B1
(45) Date of Patent: May 15, 2001

(54) IGNITER HAVING A HOT MELT IGNITION DROPLET

(75) Inventors: Glenn R. Chatley, Jr., Mesa, AZ (US); William P. Sampson, Sparks, NV (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/374,384

(22) Filed: Aug. 13, 1999

(51) Int. Cl.⁷ .............................. C06B 45/08; F42B 3/12
(52) U.S. Cl. ........................... 102/202.7; 102/202.5; 102/202.9; 149/18; 149/93; 149/105
(58) Field of Search ............... 102/202.7, 202.5, 102/202.9; 149/18, 93, 105

(56) References Cited

U.S. PATENT DOCUMENTS

| | | |
|---|---|---|
| 3,134,329 | 5/1964 | Zeman . |
| 3,686,934 * | 8/1972 | Farrand et al. ............................ 86/1 |
| 3,906,858 * | 9/1975 | Craig et al. ......................... 102/28 R |
| 4,134,780 | 1/1979 | Barnett . |
| 4,747,892 | 5/1988 | Spencer . |
| 5,210,153 | 5/1993 | Manser et al. . |
| 5,341,742 * | 8/1994 | Alford et al. ...................... 102/202.8 |
| 5,385,098 * | 1/1995 | Lindqvist et al. ................. 102/202.5 |
| 5,431,104 * | 7/1995 | Barker ............................... 102/202.7 |
| 5,648,634 | 7/1997 | Avory et al. . |
| 5,711,531 | 1/1998 | Avory et al. . |
| 5,717,158 | 2/1998 | Capellos et al. . |
| 5,821,446 * | 10/1998 | Chatley ............................. 102/202.7 |
| 5,939,660 * | 8/1999 | Fogle et al. ....................... 102/202.7 |
| 5,945,627 * | 8/1999 | Arpin et al. ..................... 102/202.11 |
| 6,085,659 * | 7/2000 | Beukes et al. ........................ 102/206 |

* cited by examiner

Primary Examiner—Edward A. Miller
(74) Attorney, Agent, or Firm—Tarolli, Sundheim, Covell, Tummino & Szabo L.L.P.

(57) ABSTRACT

An electrically actuatable igniter (24) comprises a body (60), a pair of electrodes (40) and (42) associated with the body (60), a heating element (44) electrically connected between the electrodes (40) and (42), and an ignition droplet (46) covering and adhering to the heating element (44). The ignition droplet (46) comprises a particulate primary pyrotechnic material and a secondary pyrotechnic material. The secondary pyrotechnic material has a melting point below the autoignition temperature of the primary pyrotechnic material. The secondary pyrotechnic material is in the form of a continuous, solid matrix (112) containing and adhering together the particles (114) of the primary pyrotechnic material.

8 Claims, 1 Drawing Sheet

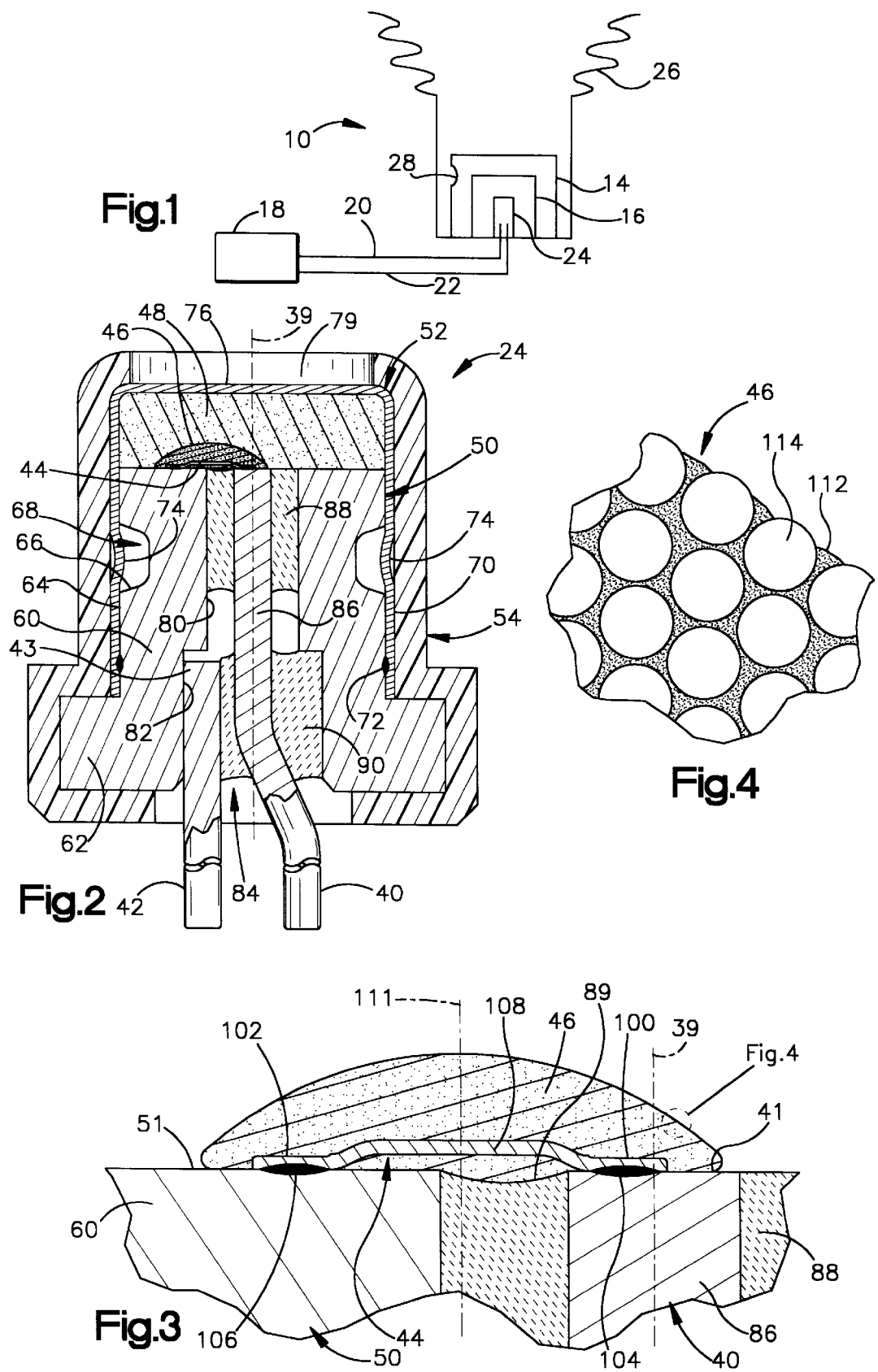

IGNITER HAVING A HOT MELT IGNITION DROPLET

FIELD OF THE INVENTION

The present invention relates to an igniter, and particularly relates to an ignition material for an igniter for inflating an inflatable vehicle occupant protection device.

BACKGROUND OF THE INVENTION

An inflatable vehicle occupant protection device, such as an air bag, is inflated by inflation gas provided by an inflator. The inflator typically contains ignitable gas generating material. The inflator further includes an igniter to ignite the gas generating material.

The igniter contains a charge of ignition material. The igniter also contains a bridgewire which is supported in a heat transferring relationship with the ignition material. When the igniter is actuated, an actuating level of electric current is directed through the bridgewire in the igniter. This causes the bridgewire to become resistively heated sufficiently to ignite the ignition material. The ignition material then produces combustion products which, in turn, ignite the gas generating material.

SUMMARY OF THE INVENTION

The present invention is an electrically actuatable igniter which comprises a body, a pair of electrodes associated with the body, a heating element electrically connected between the electrodes, and an ignition droplet covering and adhering to the heating element. The ignition droplet comprises a particulate primary pyrotechnic material and a secondary pyrotechnic material. The secondary pyrotechnic material has a melting point below the autoignition temperature of the primary pyrotechnic material. The secondary pyrotechnic material is in the form of a continuous, solid matrix containing and adhering together the particles of the primary pyrotechnic material.

The ignition droplet is made by forming a precursor mixture of the particles of the secondary pyrotechnic material and the particles of the primary pyrotechnic material. The secondary pyrotechnic material is in a molten state and the particles of the primary pyrotechnic material are dispersed in the molten state secondary pyrotechnic material. The amount of secondary pyrotechnic material is an effective amount to disperse the particles of primary pyrotechnic material. The precursor mixture is positioned on the heating element. The precursor mixture is allowed to cool, solidifying the secondary pyrotechnic material.

In an embodiment of the present invention, the particles of the secondary pyrotechnic material, the particles of the primary pyrotechnic material, and a liquid carrier, in which neither pyrotechnic material is soluble, are blended together to form a viscous slurry. The slurry is deposited onto the heating element, and is heated to a first temperature to drive off the solvent. The slurry is then heated to a second temperature to melt the secondary pyrotechnic material and form the precursor mixture in which the particles of the primary pyrotechnic material are dispersed in the molten secondary pyrotechnic material.

In another embodiment of the present invention, the particles of the secondary pyrotechnic material are heated to a temperature effective to melt the particles of the secondary pyrotechnic material. The particles of the primary pyrotechnic material are dispersed in the melt of the secondary pyrotechnic material to form the precursor mixture. The precursor mixture of the primary and secondary pyrotechnic materials is deposited on the heating element and is allowed to cool, solidifying the secondary pyrotechnic material.

BRIEF DESCRIPTION OF THE DRAWINGS

The foregoing and other features of the invention will become more apparent to one skilled in the art upon consideration of the following description of the invention and the accompanying drawings in which:

FIG. 1 is a schematic view of a vehicle occupant protection apparatus embodying the present invention;

FIG. 2 is an enlarged sectional view of a part of the apparatus of FIG. 1;

FIG. 3 is an enlarged, partial, sectional view of a part of FIG. 2; and

FIG. 4 is an enlarged, schematic, partial, sectional view of the ignition droplet in FIG. 3.

DESCRIPTION OF THE PREFERRED EMBODIMENT

Referring to FIG. 1, an apparatus 10 embodying the present invention includes an inflator 14 and an inflatable vehicle occupant protection device 26. The inflator 14 contains a gas generating composition 16. The gas generating composition 16 is ignited by an igniter 24 operatively associated with the gas generating composition 16. Electric leads 20 and 22 convey electric current to and from the igniter 24. The electric current is conveyed to the igniter 24 through a crash sensor 18 from a power source (not shown). The crash sensor 18 is responsive to vehicle deceleration indicative of a collision. A gas flow means 28, such as an opening in the inflator 14, conveys gas, which is generated by combustion of the gas generating composition 16, to the vehicle occupant protection device 26.

A preferred vehicle occupant protection device 26 is an air bag which is inflatable to help protect a vehicle occupant in the event of a collision. Other vehicle occupant protection devices which can be used with the present invention are inflatable seat belts, inflatable knee bolsters, inflatable air bags to operate knee bolsters, inflatable head liners, and inflatable side curtains.

Referring to FIG. 2, the igniter 24 has a central axis 39 and a pair of axially projecting electrodes 40 and 42. A heating element in the form of a bridgewire 44 is electrically connected between the electrodes 40 and 42 within the igniter 24. An ignition droplet 46 and a main pyrotechnic charge 48 are contained within the igniter 24. The pyrotechnic charge 48 is contained around the ignition droplet 46 so that it is in a heat receiving relationship with the ignition droplet 46. The ignition droplet 46 surrounds and is in contact with the bridgewire 44 so that it is in a heat receiving relationship with the bridgewire 44.

The igniter 24 further includes a header 50, a charge cup 52 and a casing 54. The header 50 is a metal part, preferably made of 304L steel, with a generally cylindrical body 60 and a circular flange 62 projecting radially outward from one end of the body 60. A cylindrical outer surface 64 of the body 60 has a recessed portion 66 defining a circumferentially extending groove 68.

The charge cup 52 also is a metal part, and has a cylindrical side wall 70 received in a tight fit over the body 60 of the header 50. The side wall 70 of the charge cup 52 is fixed and sealed to the body 60 of the header 50 by a circumferentially extending weld 72. The charge cup 52 is further secured to the header 50 by a plurality of circumferentially spaced indented portions 74 of the side wall 70 which are crimped radially inward into the groove 68. In this arrangement, the side wall 70 and a circular end wall 76 of the charge cup 52 together contain and hold the main pyrotechnic charge 48 in a heat transferring relationship with the ignition droplet 46. A plurality of thinned portions (not shown) of the end wall 76 function as stress risers which rupture under the influence of the combustion products generated by the main pyrotechnic charge 48. The casing 54 is a sleeve-shaped plastic part which is shrink fitted onto the header 50 and the charge cup 52 so as to insulate and partially encapsulate those parts. An opening 79 in the casing 54 allows combustion products escaping through the ruptured thinned portions of the charge cup 52 to exit the igniter 24.

The header 50 has a pair of cylindrical inner surfaces 80 and 82 which are axially aligned and together define a central passage 84 extending fully through the header 50. The first electrode 40 has an inner end portion 86 extending along the entire length of the central passage 84. A pair of axially spaced apart glass seals 88 and 90 surround the first electrode 40 in the central passage 84, and electrically insulate the first electrode 40 from the header 50 and from the electrode 42. Preferably, the glass seals 88 and 90 are formed from a barium alkali silicate glass. The electrode 42, at one end 43, seats against the header 50 in direct contact with the header 50.

As shown in FIG. 3, the bridgewire 44 extends from a radially extending surface 41 of the first electrode 40 to a radially extending surface 51 of the header 50. The bridgewire 44 has flattened opposite end portions 100 and 102 which are fixed to the electrode surface 41 and the header surface 51 by electrical resistance welds 104 and 106, respectively. Opposite end portions 100 and 102 of the bridgewire 44 become flattened under the pressure applied by the welding electrodes (not shown) that are used to form the resistance welds 104 and 106. The bridgewire 44 thus has an unflattened major portion 108 extending between the opposite end portions 100 and 102. The major portion 108 of the bridgewire 44 is bent so that the major portion 108 lies in a plane spaced from the plane of the opposite end portions 100 and 102 and from a radially extending surface 89 of the first glass seal 88 and the header surface 51.

The bridgewire 44, in one embodiment, is formed from a high resistance metal alloy. A preferred metal alloy is "NICHROME", a nickel-chromium alloy. Other suitable alloys for forming a high resistance bridgewire 44 include platinum-tungsten and 304L steel. An electrical current flow in the bridgewire 44 resistively generates heat to ignite the ignition droplet 46.

A monolithic bridge may be used in place of the bridgewire 44. A monolithic bridge consists of dissimilar conductive materials such as a thick resistive film on a ceramic substrate, a thin resistive film deposited on a ceramic substrate, or a semiconductor junction diffusion doped onto a silicon substrate. A current flow in the monolithic bridge generates heat to ignite the ignition droplet 46. Examples of monolithic bridges include: a substrate which is formed of ceramic material such as dense alumina ($Al_2O_3$), beryllia (BeO), or steatite and an alloy such as nickel-chrome, phosphorous-chrome, or tantalum nitride on the substrate.

The ignition droplet 46 of the present invention is shown in detail in FIG. 3. FIG. 3 shows the igniter 24 in a partially assembled condition in which the ignition droplet 46 has been installed on the bridgewire 44 before the charge cup 52 (which contains the main pyrotechnic charge 48) is installed over the header 50.

The ignition droplet 46 has a flattened dome shape. By flattened dome shape, it is meant substantially the shape of a segment of a sphere with a generally circular periphery centered on axis 111, and with an arcuate radial profile generally symmetrical about axis 111. More specifically, the ignition droplet 46 has a configuration substantially as shown in FIG. 3.

The ignition droplet 46 of the present invention is formed from an intimate mixture of a particulate primary pyrotechnic material and a particulate secondary pyrotechnic material. The primary pyrotechnic material has an autoignition temperature. The secondary pyrotechnic material has a melting point below the autoignition temperature of the primary pyrotechnic material.

In one embodiment of the present invention, the ignition droplet is formed by mixing particles of the primary particulate pyrotechnic material with particles of the secondary pyrotechnic material using conventional powder mixing methods. The mixture of the particles of the primary pyrotechnic material and the particles of secondary pyrotechnic material is added to a liquid carrier, in which neither the primary pyrotechnic material nor the secondary pyrotechnic material is soluble, and mixed wet to form a viscous slurry. An example of a suitable liquid carrier is water.

The ignition droplet 46 is installed on the bridgewire 44 by depositing a pre-determined amount of the viscous slurry from a dispensing system over the bridgewire 44. The droplet that is deposited is initially spherical, but the liquid in the slurry wets the surfaces which are contacted by the droplet, causing the droplet to adopt the semi-spherical configuration of FIG. 3.

The ignition droplet 46 after being deposited on the bridgewire 44 is heated to a first temperature sufficient to drive the liquid carrier from the particle mixture. The ignition droplet 46 is then heated to a second temperature sufficient to melt the particles of the secondary pyrotechnic material. The secondary pyrotechnic material has a melt viscosity that allows it to form a precursor mixture in the form of a continuous matrix and the particles of primary pyrotechnic material are dispersed in the continuous matrix. The secondary pyrotechnic material on cooling and solidification bonds the ignition droplet 46 to the bridgewire 44, the header surface 51, the electrode surface 41, and the glass seal surface 89. The second temperature is lower than the autoignition temperature of the primary pyrotechnic material. The amount of molten secondary pyrotechnic material is an effective amount to form the continuous matrix around the particles of the primary pyrotechnic material.

In another embodiment of the present invention, the ignition droplet is formed by heating the particles of secondary pyrotechnic material to a temperature and for an amount of time sufficient to melt the particles of secondary pyrotechnic material. This heating causes the particles of the secondary pyrotechnic material to liquefy. The heating temperature is below the autoignition temperature of the primary pyrotechnic material. The particles of the primary pyrotechnic material are then added to the secondary pyrotechnic material in the liquid state and mixed to form a precursor mixture in which the particles of primary pyrotechnic material are dispersed in the molten secondary pyrotechnic material. The melt viscosity of the secondary pyrotechnic material is effective to obtain a dispersion of the primary pyrotechnic material particles in the secondary pyrotechnic material. The amount of molten secondary pyrotechnic material is an effective amount to form a continuous matrix of molten secondary pyrotechnic material around the particles of the primary pyrotechnic material.

The ignition droplet 46 is installed on the bridgewire 44 by depositing a pre-determined amount of the viscous, molten slurry from a dispensing system over the bridgewire 44. The droplet that is deposited is initially spherical, but the liquefied secondary pyrotechnic material in the viscous, molten slurry wets the surfaces which are contacted by the droplet. This causes the droplet to adopt the semi-spherical configuration of FIG. 3 and spread out over surfaces 51, 41, and 89 of the header 50, electrode 40, and glass seal 88, respectively.

The ignition droplet 46 after being deposited on the bridgewire 44 is cooled to room temperature to solidify the molten secondary pyrotechnic material in the ignition droplet 46 as well as bond the ignition droplet 46 to the bridgewire 44, the header surface 51, the electrode surface 41, and the glass seal surface 89.

The structure of the ignition droplet 46 is shown in FIG. 4. FIG. 4 is an enlarged, schematic, partial, sectional representation of the primary pyrotechnic material and the secondary pyrotechnic material in the ignition droplet 46.

The secondary pyrotechnic material, upon melting, forms a continuous matrix 112 which contains and adheres together the particles 114 of the primary pyrotechnic material. The particles 114 of the primary pyrotechnic material contained and adhered together in the continuous matrix 112 of the ignition droplet 46 preferably have a substantially uniform shape which is essentially spherical to aid in processing. Preferably, the average diameter of the particles 114 of the primary pyrotechnic material is in the range of about 4 microns to about 200 microns. More preferably, the average diameter of the particles 114 of the primary pyrotechnic material is about 50 microns plus or minus about 30 microns. The particle diameter is determined in part by the amount and fluid characteristics of the secondary pyrotechnic material.

The amount of the secondary pyrotechnic material is that amount necessary to form a continuous matrix 112 in which the particles 114 of the primary pyrotechnic material are dispersed. Preferably, the amount of the secondary pyrotechnic material is about 20% to about 40% by weight of the combined weight of the primary pyrotechnic material and the secondary pyrotechnic material. More preferably, the amount of the secondary pyrotechnic material is about 25% to about 30% by weight of the combined weight of the primary pyrotechnic material and the secondary pyrotechnic material.

The amount of the primary pyrotechnic material in the present invention is that amount necessary to achieve sustained, rapid combustion of the primary pyrotechnic material upon ignition. Preferably, the amount of the primary pyrotechnic material is about 60% to about 80% by weight of the combined weight of the primary pyrotechnic material and the secondary pyrotechnic material. More preferably, the amount of the primary pyrotechnic material is about 70% to about 75% by weight of the combined weight of the primary pyrotechnic material and the secondary pyrotechnic material.

The secondary pyrotechnic material of the present invention has a melting temperature below the autoignition temperature of the primary pyrotechnic material. The melting temperature of the secondary pyrotechnic material is above about 125° C. Moreover, the secondary pyrotechnic material readily combusts upon ignition of the primary pyrotechnic material to achieve sustained and rapid combustion of the ignition droplet. Preferably, the secondary pyrotechnic material has a low melt viscosity. A low melt viscosity allows the particles of secondary pyrotechnic material to puddle or liquefy upon melting and form the continuous solid matrix 112 which contains and adheres together the particles 114 of the primary pyrotechnic material.

Preferred secondary pyrotechnic material for the present invention includes pentaerythrite tetranitrate, dinitronaphthalene, or mixtures thereof. Pentaerythrite tetranitrate melts in the range of about 138° C. to about 140° C. Dinitronaphthalene melts at about 153° C. These secondary pyrotechnic materials have the advantage that they are neither brittle at a temperature of about −40° C. nor lose shape or configuration at a temperature of about 125° C., the lower and upper temperatures at which the vehicle occupant protection apparatus is required to be operational. Moreover, these pyrotechnic materials are combustible upon ignition of the primary pyrotechnic material.

The primary pyrotechnic material has an autoignition temperature above the melting point of the secondary pyrotechnic material. Furthermore, the primary pyrotechnic material, upon combustion, provides sufficient amount of heat to ignite the secondary pyrotechnic material. The preferred primary pyrotechnic material for the present invention includes potassium dinitrobenzofuroxan (KDNBF), barium styphnate monohydrate (BARSTY), cis-bis-(5-nitrotetrazolato)tetraaminecobalt(III)perchlorate (BNCP), 2-(5-cyanotetrazolato)pentaaminecobalt(III)perchlorate (CP), diazidodinitrophenol (DDNP), 1,1-diamino-3,3,5,5-tetraazidocyclotriphosphazene (DATA), cyclotetramethylenetetranitramine, lead azide, or lead styphanate. More preferably, the pyrotechnic material of the present invention is potassium dinitrobenzofuroxan (KDNBF). These primary pyrotechnic materials all have autoignition temperatures above about 195° C.

When the igniter 24 is actuated, an actuating level of electric current is directed through the bridgewire 44 between the electrodes 40 and 42. As the actuating level of the electric current is conducted through the bridgewire 44, the bridgewire 44 generates heat which is transferred directly to the ignition droplet 46. The particles 114 of primary pyrotechnic material adjacent to the bridgewire 44 combust, resulting in complete combustion of the particles 112 of the primary pyrotechnic material and combustion of the continuous matrix 112 of secondary pyrotechnic material. Combustion of the primary pyrotechnic material and the secondary pyrotechnic material in the ignition droplet produces combustion products, including heat, hot gases and hot particles, which ignite the main pyrotechnic charge 48. The pyrotechnic charge 48 then produces additional combustion products which are spewed outward from the igniter 24.

EXAMPLE

This Example illustrates preparation of an ignition droplet in accordance with the present invention.

75 mg of particulate potassium dinitrobenzofuroxan (KDNBF) and 25 mg of particulate pentaerythrite tetranitrate are added to a mixing device ("POWERGEN" No. 35 manufactured by Powergen Inc.). The particles of the potassium dinitrobenzofuroxan have an average diameter of about 50 microns and an autoignition temperature of about 211° C. The particles of pentaerythrite tetranitrate have an average diameter of about 5 microns and a melting point of about 138° C. to about 140° C.

The potassium dinitrobenzofuroxan and pentaerythrite tetranitrate are blended until the particles of potassium dinitrobenzofuroxan are uniformly dispersed with the particles of pentaerythrite tetranitrate. Water is added to the uniform mixture of potassium dinitrobenzofuroxan and pentaerythrite tetranitrate until a viscous slurry is formed. The viscous slurry of potassium dinitrobenzofuroxan and pentaerythrite tetranitrate is placed in an automated dispensing syringe. The dispensing syringe is positioned above the bridgewire of an igniter. A 2.9 cc ignition droplet is dispensed from the automated syringe by a LCC/DISPENSIT No. 20 dispensing valve onto the surface of the bridgewire at ambient temperature (25° C.). The ignition droplet flows fully around the bridgewire to the dome-shaped configuration shown in FIG. 3, spreading to and covering portions of the header surface, electrode surface, and glass seal surface.

The droplet is heated to about 100° C. until water carrier liquid is driven off. The ignition droplet is then heated to a temperature of about 140° C. until the particles of pentaerythrite tetranitrate melt (about 20 seconds). The ignition droplet is then cooled to room temperature (i.e. 22° C.). The ignition droplet has a continuous solid matrix of pentaerythrite tetranitrate containing and adhering together the particles of KDNBF. The ignition droplet is neither brittle at −40° C. nor capable of losing its shape or configuration at 125° C.

Advantages of the present invention should now be apparent. Primarily, the present invention takes advantage of the favorable processing characteristics of using a secondary pyrotechnic material which has a melting point above about 125° C. but below the autoignition temperature of a particulate primary pyrotechnic material, and which has a low melt viscosity, to form a matrix which contains and adheres together the particulate primary pyrotechnic material. The formation of a continuous matrix comprising the secondary pyrotechnic material to contain and adhere together the primary pyrotechnic material reduces the misfires or incomplete combustion associated with droplets that utilize a conventional binder to contain and adhere together the primary pyrotechnic material.

From the above description of the invention, those skilled in the art will perceive improvements, changes and modifications. Such improvements, changes and modifications within the skill of the art are intended to be covered by the appended claims.

Having described the invention, the following is claimed:

1. An electrically actuatable igniter comprising:
    a body;
    a pair of electrodes associated with said body;
    a heating element electrically connected between said electrodes;
    an ignition drop adhering to said heating element, said ignition droplet comprising (a) a particulate primary pyrotechnic material, and (b) a secondary pyrotechnic material selected from the group consisting of pentaerythrite tetranitrate, dinitronaphthalene and mixtures of pentaerythrite tetranitrate and dinitronaphthalene, said secondary pyrotechnic material being in the form of a continuous, solid matrix containing and adhering the particles of the primary pyrotechnic material.

2. The igniter of claim 1 wherein the primary pyrotechnic material is selected from the group consisting of potassium dinitrobenzofuroxan (KDNBF), barium styphnate monohydrate (BARSTY), cis-bis-(5-nitrotetrazolato)tetraamine(III) perchlorate (BNCP), 2-(5-cyanotetrazolato) pentaaminecobalt(III)perchlorate (CP), diazidodinitrophenol (DDNP), 1,1-diamino-3,3,5,5-tetraazidocyclotriphosphazene (DATA), cyclotetramethylenetetranitramine, lead azide, and lead styphnate.

3. The igniter as defined in claim 1 wherein the amount of secondary pyrotechnic material in the ignition droplet is about 20% to about 40% by weight based on the combined weight of the primary pyrotechnic material and the secondary pyrotechnic material.

4. The igniter as defined in claim 1 wherein the particles of primary pyrotechnic material have an average diameter of about 4 to about 200 microns.

5. An electrically actuatable igniter comprising:
    a body;
    a pair of electrodes associated with said body;
    a heating element electrically connected between said electrodes;
    an ignition droplet adhering to said heating element, said ignition droplet comprising particulate potassium dinitrobenzofuroxan and dinitronaphthalene, the dinitronaphthalene being in the form of a continuous, solid matrix containing and adhering the particles of potassium dinitrobenzofuroxan.

6. An electrically actuatable igniter comprising:
    a body;
    a pair of electrodes associated with said body;
    a heating element electrically connected between said electrodes;
    an ignition droplet adhering to said heating element, said ignition droplet being made of particulate potassium dinitrobenzofuroxan and pentaerythrite tetranitrate, the pentaerythrite tetranitrate being in the form of a continuous, solid matrix containing and adhering together particles of the potassium dinitrobenzofuroxan.

7. The igniter as defined in claim 6 wherein the amount of potassium dinitrobenzofuroxan in the ignition droplet is about 70% to about 75% by weight of the combined weight of the potassium dinitrobenzofuroxan and the pentaerythrite tetranitrate.

8. The igniter as defined in claim 7 wherein the amount of pentaerythrite tetranitrate in the ignition droplet is about 25% to about 30% by weight of the combined weight of the potassium dinitrobenzofuroxan and the pentaerythrite tetranitrate.

* * * * *